Nov. 19, 1963  R. M. WILMOTTE  3,111,666
METHOD AND APPARATUS FOR OPTICALLY PROCESSING INFORMATION
Filed Aug. 8, 1961  2 Sheets-Sheet 1
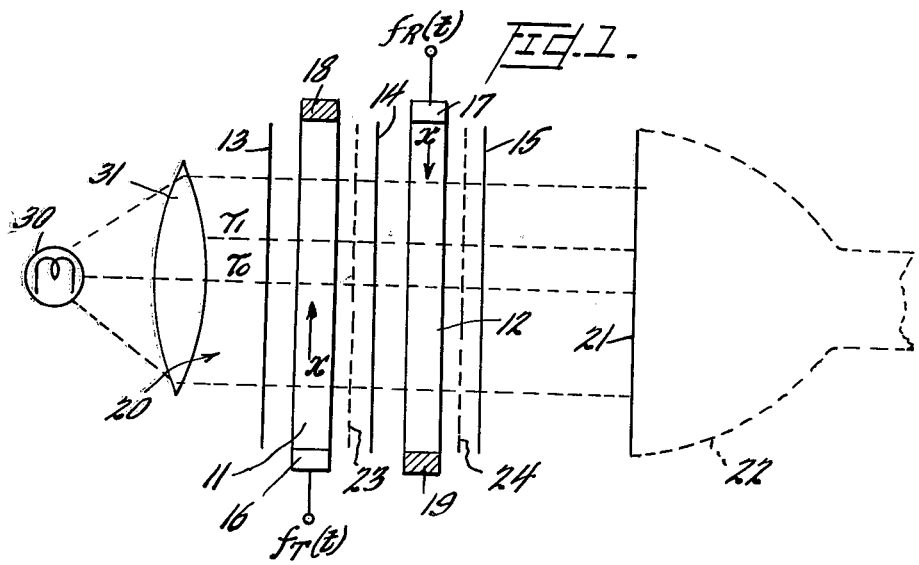
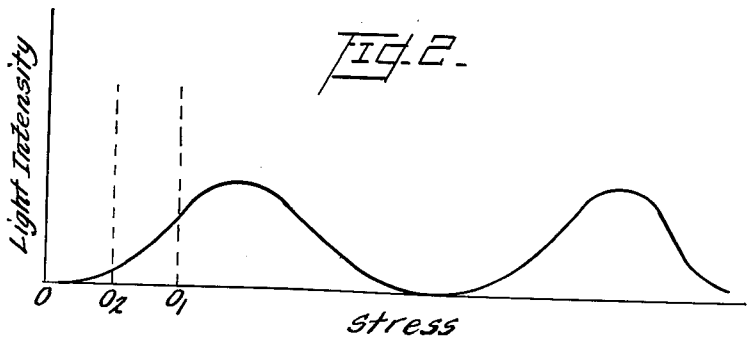
INVENTOR
Raymond M. Wilmotte,
BY Paris, Haskell & Levine
ATTORNEYS Nov. 19, 1963   R. M. WILMOTTE   3,111,666
METHOD AND APPARATUS FOR OPTICALLY PROCESSING INFORMATION
Filed Aug. 8, 1961   2 Sheets-Sheet 2
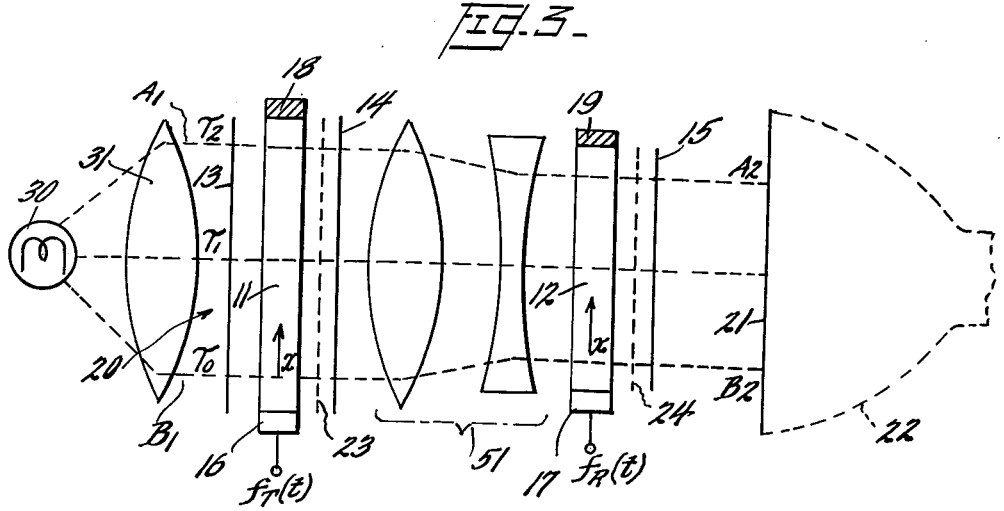
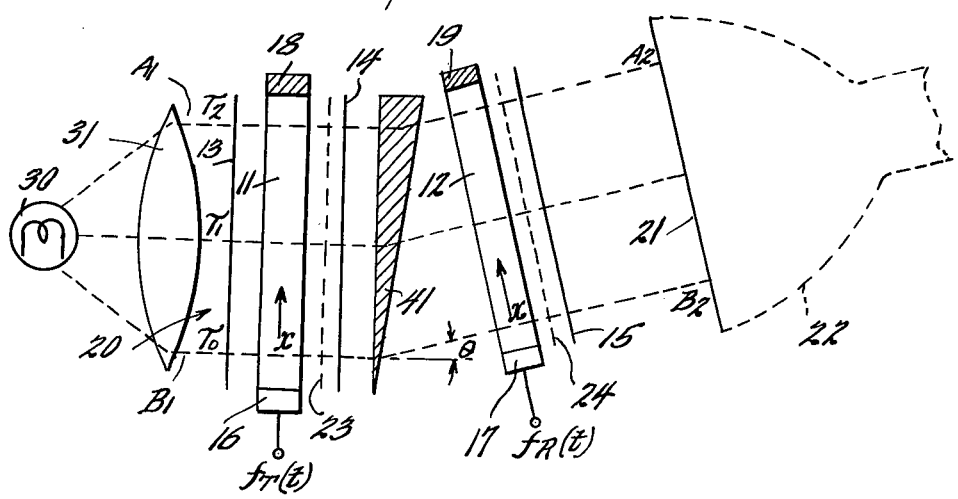
INVENTOR
Raymond M. Wilmotte,
BY Paris, Haskell & Devine
ATTORNEYS United States Patent Office 3,111,666
Patented Nov. 19, 1963

3,111,666
METHOD AND APPARATUS FOR OPTICALLY PROCESSING INFORMATION
Raymond M. Wilmotte, 6 Newlin Road, Princeton, N.J.
Filed Aug. 8, 1961, Ser. No. 130,010
14 Claims. (Cl. 343—13)

The present invention relates to the field of optical information processing, particularly by means of optical cross-correlation techniques. This invention is described herein with particular reference to radar and the processing of radar information, to obtain an indication or measure of target range; however, the application of the invention to radar is only exemplary, in order to facilitate a complete understanding of the invention and its operation, and it is not to be construed as limited to this application.

A basic tool utilized in the particular specific embodiment of the present invention described herein is a transparent, ultrasonic bi-refractive, solid delay line sandwiched between crossed light polarizers. The delay line is associated with a transducer for converting an electrical signal into a coresponding ultrasonic wave, as the intelligence or information input to the line; while a beam of light is applied through the polarizers and the delay line transversely thereof and is modified by the sonic energy of the intelligence input. The sonic energy of the input signal travels down the delay line, and the stresses introduced by this energy cause a bifractive effect on the light passing through the delay line, consequently affecting the light pattern emerging from the delay line-polarizer system. This modulation of the light at any particular instant for a given point along the delay line is a function of the ultrasonic signal or waveform present at that point. Thus, the intensity of light passed by the system at any selected point along the delay line varies in time in accordance with the input signal. Likewise, the emergent overall light intensity pattern for the entire length of the delay line corresponds to the ultrasonic waveform present along the line at any particular instant, and this overall emergent light pattern of course varies in time in accordance with a continuing information or input signal to the line.

If two such delay line-polarizer systems are employed, and arranged so that a single beam of light passes through both systems serially, while a first input signal is applied to one delay line transducer and a second input signal is applied to the other delay line transducer, the light output of the combined system is the cross-correlation function of the two input signals, and obtains a maximum time integrated light output for the system where the waveforms on the two delay lines are identical and in spatial registry along their respective lines. Thus, if a signal is transmitted for radar purposes having a waveform $f_T(t)$ (which may be a pulse, or other waveform such as a random noise signal), in a time period thereafter the echo signal is received from a target and it has a waveform $f_R(t)$. The received signal may be identical to the transmitted signal, or it may vary therefrom a Doppler frequency if there is relative motion between the radar station and the target. In accordance with the present invention, the transmitted signal is applied to one delay line transducer, while the received signal is applied to the other delay line transducer. The maximum integrated light intensity pattern emergent from the system appears at the point along the delay line where registering portions of the two traveling waveforms $f_T(t)$ and $f_R(t)$ obtain identity, or are most nearly identical, or where the received signal obtains maximum correlation with the transmitted signal. Since the point along the delay lines where this identity or maximum correlation occurs is a function of the time delay between application of the two signals to their respective delay lines, this point is a measure of the range of the target. It is understood, of course, that references in this specification to waveforms $f_R(t)$ and $f_T(t)$ as received and transmitted signals, are intended to refer to the modulations of the carrier, or to an intermediate frequency of the carrier if desired, as is conventional in radar processing techniques.

In accordance with the prior art, systems of the type described above are arranged or designed so that the transmitted and received signals travel in opposite directions along their respective delay lines, and the point of maximum correlation being detected as identical portions of the two signals cross each other spatially in their respective delay lines. In such an arrangement it is apparent that the range or spatial time delay scale obtained by the system has a fixed relation to the velocity of the sonic energy in the delay line medium. Furthermore, it will be appreciated that since the two signals are traveling in opposite directions on their delay lines, zero range is at the delay lines mid-point. Consequently, only one-half of the delay line system is being effectively utilized in the range scale. The present invention contemplates the expansion or variation of the spatial time delay or range scale of the system, along with effective utilization of the entire delay line system. Basically, this improvement is accomplished by causing the two signals to travel in the same direction in their respective delay lines, but with the received or time delayed signal traveling in its delay line at what may be considered an effective or an apparent greater velocity than the transmitted or base signal in its delay line. Thus, although the two signals are caused to travel in the same direction along their respective delay lines, spatial coincidence or registry is nevertheless obtained between corresponding portions of the two signals, and the point of coincidence along the delay line system constitutes a measure of the time delay between transmission and reception of a given signal or portion of a signal hence becomes a measure of the target range.

What is herein termed an "effective" or "apparent" greater velocity for the received signal than for the transmitted signal in the respective delay lines, is accomplished in accordance with the present invention by interposing in optical system between the two delay lines so as to compress the light pattern emergent from the first or transmitted signal delay line in the length or signal traveling dimension thereof. This compressed light pattern is then passed through the second or received signal delay line thereby effecting a lesser operational length for this delay line. Thus, although the actual signal velocity along the second delay line may be the same as that along the first, the time of traverse of a given received signal along its shorter length of delay line is less than the time of traverse of a given transmitted signal along its longer length of delay line. By selecting an appropriate ratio of first to second delay line lengths, a desired ratio of spatial scale to actual time delay between the two signals may be obtained from the system.

It is accordingly one object of the present invention to provide for the cross-correlation of two signals having substantially similar waveforms, or substantially similar structures in their waveforms.

Another object of the present invention is to provide for the measurement of the time displacement between two signals having substantially similar waveforms or substantially similar structures in their waveforms, by optical cross-correlation techniques.

Another object of the present invention is to provide for selection of a desired spatial time scale in the measurement by optical cross-correlation techniques of the time displacement between two signals having substantially similar waveforms or substantially similar structures in their waveforms.

Another object of the present invention is to provide for selection of a desired spatial time scale in the optical cross-correlation of two time displaced signals having substantially similar waveforms or substantially similar structures in their waveforms, in ascertaining the time displacement thereof.

Still another object of the present invention is to provide for the selection of a desired spatial time scale in the processing of radar information by optical cross-correlation techniques, in ascertaining the range measurement of a target.

Other objects and advantages of the present invention will become apparent to those skilled in the art from a consideration of the following detailed description of exemplary specific embodiments thereof, had in conjunction with the accompanying drawings, in which like numerals refer to like or corresponding parts and wherein:

FIG. 1 is a schematic showing of an optical cross-correlator as utilized in the prior art;

FIG. 2 is an illustrative graphic plot of light intensity versus stress as passed by a delay line and crossed polarizer system as illustrated in FIG. 1;

FIG. 3 is a schematic showing of an optical cross-correlator having one embodiment of optical image compression as utilized in the present invention; and FIG. 4 is a schematic showing of an optical cross-correlator having a second embodiment of optical image compression as utilized in the present invention.

With particular reference to the optical cross-correlator shown in FIG. 1, the signal processing system thereof comprises two transparent, solid, ultra-sonic, bi-refractive delay lines 11 and 12, sandwiched between crossed light polarizer films 13, 14 and 15. The delay line panels are preferably formed of fused quartz, and have substantial length in their X dimension. The input end of each delay line has coupled thereto an electrical-sonic transducer, 16 for line 11, and 17 for line 12. These transducers are preferably piezo-electric devices having suitable electrodes for application of an electric signal. The end of each delay line remote from the input transducer is provided with a sonic energy absorber, 18 for line 11, and 19 for line 12, for absorbing the sonic energy traveling down the line, and preventing or minimizing reflections of sonic energy which would interfere with subsequent input signal waveforms on the delay line.

Delay line 11 is sandwiched between polarizers 13 and 14, which are crossed, or whose axes are displaced 90° relative to each other. Also, it is preferred that these polarizers be oriented at 45° relative to the line of travel polarizers down the delay line 11 when compressional sonic waves are being employed. In the case of shear waves, it is preferred that the orientation be parallel and perpendicular to the direction of travel of the energy. These respective relationships provide maximum sensitivity for the system. Delay line 12 is sandwiched between crossed polarizers 14 and 15, which occupy the same relationship to line 12 and to each other as do polarizers 13 and 14 to line 11 and to each other. Wherefore, it follows that polarizer 15 is oriented the same as polarizer 13.

The system is energized by or operates on a parallel beam of light 20 emanating from light source 30 and lens 31, which passes through the polarizer film 13 through the delay line 11 transverse to the line of travel X of sonic energy therein, through polarizer 14, and then similarly through delay line 12 and polarizer 15, to emerge upon a light integrating screen 21, which may be the photoconductor plate of a television type camera tube 22, for example. The light pattern emergent from line 11 may, of course, desirably be optically focused on line 12, and similarly with respect to the transmission of light from line 12 to screen 21, by lens systems not shown. In passing through polarizer 13, light beam 20 is polarized in one plane. The polarized light then passes through delay line 11 to polarizer 14. If there is no sonic signal in line 11, essentially no light is passed by second polarizer 14. However, the presence of a sonic signal on line 11 creates corresponding stresses in the quartz in accordance with the fine structure of the waveform of that signal, as it is distributed and travels along the delay line in the direction X. These stresses produce a bi-refractive effect on the light transmitted through the delay line, and therefore, the intensity of light emerging from second polarizer 14 varies sinusoidally with the stress, or the amplitude of the waveform present on the delay line. Thus, if a continuous electrical signal $f_T(t)$ is applied to transducer 16, at any instant the light emergent from polarizer 14 obtains an intensity pattern along the dimension X which corresponds to the amplitude pattern or function contained in the input signal $f_T(t)$ for that segment or portion of the signal distributed along the delay line at that particular instant. This emergent light intensity pattern varies with time, of course, as the signal $f_T(t)$ is continued to be applied and as the signal travels down the line to the absorber 18. The other delay line 12 functions in the same manner in cooperation with polarizers 14 and 15, in response to the light beam pattern emergent from polarizer 14, and operates upon that light beam with an electrical input signal $f_R(t)$. The ultimate light intensity pattern emergent from polarizer 15 embodies the cross-correlation function of the two signals $f_T(t)$ and $f_R(t)$. Since the correlation function output is expressed in terms of light intensity, the emergent light pattern is integrated on a photoconductor screen 21, and may be conveniently read out electrically by electronic scanning of the screen 21.

The light intensity emergent from either delay line-crossed polarizer set of FIG. 1 for any given point along the dimension X, varies correspondingly with the amount of stress present at that point in the delay line according to a sinusoidal law as shown in FIG. 2. In the preferred embodiment of the invention, a quarter-wave optical plate is inserted between each pair of crossed polarizers, at any convenient point. Thus one quarter-wave optical plate 23 is inserted between polarizers 13 and 14, and another quarter-wave optical plate 24 is inserted between polarizers 14 and 15. The purpose of the quarter-wave optical plates is to shift the origin of the stress-optical characteristic to a desired point on the curve of FIG. 2. When the axis of the quarter-wave plate is parallel or perpendicular to the length of X dimension of the respective associated delay line for compressional waves, or 45° to said X dimension for shear waves, the origin of the stress-optical characteristic is located at $O_1$. This origin may be shifted to any point between O and $O_1$, such as $O_2$, by changing the orientation of the quarter-wave plate. The system is preferably set to have its origin at $O_1$ in order to operate over the most linear portion of the stress-optical characteristic curve.

When utilizing the system of FIG. 1 to process radar information, an input signal is applied to transducer 16, and is designated as $f_T(t)$, this being the transmitted radar signal applied to transducer 16 substantially coincident with transmission thereof. The received radar signal designed $f_R(t)$ is the input signal applied to transducer 17 substantially coincident with reception thereof. These signals may be pulses, or continuous signals having an appropriate repetitive or a random pattern. Each signal applied to the respective transducer is injected into the corresponding delay line and travels in a finite time as sonic energy along its length dimension X to the end of the delay line, where it is absorbed.

Thus, it is apparent that there is a time delay between the application of a given increment of signal $f_T(t)$ to delay line 11, and the application of that increment after reflection by the target to delay line 12, as signal $f_R(t)$. Assuming that the time of travel of a signal along the delay line is greater than the radio transmission-reflection time corresponding to the range of a target, a given increment of reflected signal $f_R(t)$ traveling down delay line 12 will pass in spatial coincidence with the corresponding increment of transmitted signal $f_T(t)$ traveling in delay line 11 at some point along the X dimension of the delay lines. Since the location of this point varies with the time lapse between transmission and reception of the given signal increment, the location of this point becomes a measure of the range of the target.

The cross-correlation of signals $f_T(t)$ and $f_R(t)$ is a maximum at said point of spatial coincidence of these two signals, providing a maximum complementing of light modulation to accord with the double crossed polarizers 13, 14 and 15, and a maximum quantity of light output over a period of time. The light output pattern emergent from polarizer film 15 is integrated on photoconductor screen 21. For a particular target range, the maximum integrated light output value occurs at a particular point on screen 21, and this value or reading may be detected by electronic scanning of the screen, such as with a television camera tube 22, or alternatively by incorporating the photoconductor screen as one layer of a photoconductive electroluminescent light amplifier panel.

It will be readily appreciated that in the system shown in FIG. 1, zero time delay between signal $f_T(t)$ and signal $f_R(t)$ provides cross-correlation of the two signals and a maximum integrated light output emergent from polarizer 15 at the center of the delay lines along the $T_0$ axis. As the time delay increases from zero, the maximum integrated light output area moves up along the delay lines in the direction of the $T_1$ axis. Thus, since time is a function of range, the location of maximum integrated light output, as detected by screen 21 and read out by camera tube 22, becomes a measure of target range. Since in radar applications, the received signal $f_R(t)$ is always delayed with respect to the transmitted signal $f_T(t)$, only one-half, the upper half, of the delay line system is utilized in measurement. Further, only one spatial scale for the range measurement is available, and that is dependent upon the velocity of sonic energy in the delay lines.

In accordance with the present invention, the full length of the delay lines is utilized, and various spatial scales for range measurements may be selected. One embodiment of such a system is shown in FIG. 3. This system includes all the elements of FIG. 1, which have been correspondingly numbered, and further detailed description of these corresponding elements and of their function and operation is not necessary. However, the system of FIG. 3 differs from that of FIG. 1 in several material respects. Delay line 12 is shorter than delay line 11; the signal input transducers 16 and 17 are located at corresponding ends of the respective delay lines 11 and 12 so that input signals $f_T(t)$ and $f_R(t)$ travel in the same direction along the lengths of the respective delay lines; and a lens system 51 is interposed between delay lines 11 and 12 designed to compress the light image emergent from delay line 11 before it impinges on delay line 12, as indicated by the dotted lines $A_1-A_2$ and $B_1-B_2$. By making delay line 12 shorter than delay line 11, it is apparent that an input signal will travel from one end to the other of the shorter delay line in a lesser time than in the longer delay line. And by compressing the light pattern emergent from line 11 to correspond with the shorter line 12, signals traveling along line 12 effectively, or appear, to travel faster than signals along line 11. Thus, if signals $f_T(t)$ and $f_R(t)$ are applied to their delay lines simultaneously, maximum integrated light output from cross-correlation between these signals is obtained at the $T_0$ axis. As a time delay between the signals $f_T(t)$ and $f_R(t)$ is increased, the point of maximum correlation moves up along the delay lines toward the $T_1$ and $T_2$ axes, with the maximum delay measurable on the system being at the $T_2$ axis. The ratio of time delay between input signals to spatial displacement of the maximum correlation point along the delay lines increases in direct relation to an increase in the difference in length between the delay lines. In other words, the T scale in the drawings is expanded as the lengths of the delay lines are changed toward equality, and the T scale is compressed as delay line 12 is made shorter relative to line 11.

The same results as described above may be obtained by means of a prism instead of the lens system of FIG. 3. This is illustrated in FIG. 4, where the elements have been numbered correspondingly with those of FIGS. 1 and 3. As in FIG. 3, in FIG. 4 both input signals $f_T(t)$ and $f_R(t)$ are introduced in the corresponding ends of the delay lines 11 and 12, and delay line 12 is shorter than line 11. In place of the lens system 51, a prism 41 is employed to compress the light pattern emergent from line 11, the degree of compression being a function of the angle of the prism, and being related to the angle of refraction of the light $\theta$ by the equation $$\frac{A_2B_2}{A_1B_1} = \cos\theta$$

$A_2B_2$ being the length of the optical image after refraction, and $A_1B_1$ being the length before refraction (see FIG. 4). Delay line 12 should of course be tilted relative to line 11 by an amount equal to the angle of refraction in order to be oriented perpendicularly to the beam of light.

In each of the specific embodiments shown in FIGS. 3 and 4, delay line 12 is shorter than delay line 11. This is done because the optical image emergent from line 11 has been compressed, and the length of line 12 has been chosen to correspond thereto. However, the same effect may be obtained even if line 12 is equal in length or longer than line 11, provided that the input end of the line 12 adjacent transducer 17 is placed at the lower end of the optical image, or at the $T_0$ line $B_1-B_2$. It will be readily appreciated, of course, that in such a situation the effective portion of line 12 cooperating in the optical processing operation is still shorter than line 11 and corresponds in length to the length of the compressed optical image impinged upon the line 12. Also, it should be apparent that the T scale [spatial displacement of the cross-correlation point along the line 12 for a given time delay between the two signals $f_T(t)$ and $f_R(t)$] can be made variable. This may be accomplished by providing two adjustments: the first adjustment being in the image compressing optical system (51 in FIG. 3, and 41 in FIG. 4) to adjust the size of optical image caused to impinge upon line 12; and the second adjustment being in the position of line 12 relative to line 11 in order that the $T_0$ point on the line 12 may be caused to correspond with that point in the optical image applied to line 12, and in the case of FIG. 3 so that the line 12 may be oriented perpendicularly to the light image emerging from the prism 41 for various angles of refraction $\theta$. By the term adjustment, substitution of different prism or lens systems is contemplated, as well as substitution of different prisms or lens and delay line couples for prism 41 and line 12 of FIG. 4 and lens 51 and line 12 of FIG. 3.

Other modifications and variations of the described specific embodiments will be apparent to those skilled in the art. Accordingly, it is understood that the described specific examples of the present invention are presented merely by way of example to facilitate a complete understanding of the invention, and such modifications, changes, or variations as are embraced by the spirit and scope of the appended claims, are contemplated as within the purview of the present invention.

What is claimed is:

1. An optical correlator comprising a first and second birefractive, transparent, sonic delay line, means for introducing a sonic energy signal into each of said delay lines, means for transmitting a beam of light serially through said two delay lines, means for integrating the light pattern emergent from the two delay lines, crossed polarizers sandwiching each of said two delay lines, and means interposed between said first and second delay lines for compressing the light image emergent from the first delay line before said image is applied to said second delay line.

2. An optical correlator as set forth in claim 1, wherein said sonic energy introducing means are each located at corresponding ends of their respective delay lines to cause the signals introduced into both lines to travel in corresponding directions.

3. An optical correlator as set forth in claim 2, wherein said light image compressing means includes a prism.

4. An optical correlator as set forth in claim 2, wherein said light image compressing means includes a lens.

5. A system for processing radar information to obtain an indication of target range, comprising means for transforming a first signal, characteristic of the transmitted radar signal, into a form capable of affecting a beam of light in accordance with the waveform of the first signal, means for transforming a second signal, characteristic of the received radar echo signal, into a form capable of affecting a beam of light in accordance with the waveform of the second signal, first and second means for respectively conducting said two transformed signals past each other, means for directing a beam of light serially through said first and second conducting means, means for detecting the combined effect of the two transformed signals upon said beam of light, means for integrating the detected light pattern, and means interposed between said first and second conducting means for compressing the light pattern emergent from said first conducting means before it is applied to said second conducting means.

6. A system as set forth in claim 5, wherein the two transforming and conducting means comprise a pair of bi-refractive, transparent, sonic delay lines, each having an electrical-sonic transducer at one end, and a sonic energy absorber at the opposite end, said detecting means comprises crossed light polarizers sandwiching each delay line, and said integrating means comprises a photoconductive plate.

7. A system as set forth in claim 6, wherein said transducers are located at corresponding ends of the respective delay lines to cause the transformed signals to travel along the respective delay lines in corresponding directions.

8. A system as set forth in claim 7, wherein said image compressing means includes a prism.

9. A system as set forth in claim 7, wherein said image compressing means includes a lens.

10. A an optical correlator, comprising means for transforming a first input signal into a form capable of affecting a beam of light in accordance with the waveform of the signal, means for transforming a second input signal into a form capable of affecting a beam of light in accordance with the waveform of the signal, first and second means for respectively conducting said two transformed signals past each other, means for directing a beam of light serially through said first and second conductive means, means for detecting the combined effect of the two transformed signals upon said beam of light, means for integrating the detected light pattern, and means interposed between said first and second conducting means for compressing the light image emergent from said first conducting means before it is applied to said second conducting means.

11. An optical correlator as set forth in claim 10, wherein said input signals are electrical signals, the two transforming and conducting means comprise a pair of bi-refractive, transparent, sonic delay lines, each having an electrical-sonic transducer at one end, and a sonic energy absorber at the opposite end, said detecting means comprises crossed light polarizers sandwiching each delay line, and said integrating means comprises a photoconductive plate.

12. An optical correlator as set forth in claim 10, wherein said two transforming means are located at corresponding ends of their respective conducting means for causing the two transformed signals to travel along the respective conducting means in corresponding directions.

13. An optical correlator as set forth in claim 10, wherein said image compressing means includes a prism.

14. An optical correlator as set forth in claim 10, wherein said image compressing means includes a lens.

No references cited.